(12) United States Patent
Sundarar

(10) Patent No.: US 8,570,652 B2
(45) Date of Patent: Oct. 29, 2013

(54) SOLID VISION

(76) Inventor: Nagappan Muthusamy Sundarar, Erode (IN)

( * ) Notice: Subject to any disclaimer, the term of this patent is extended or adjusted under 35 U.S.C. 154(b) by 655 days.

(21) Appl. No.: 12/308,874

(22) PCT Filed: Apr. 16, 2007

(86) PCT No.: PCT/IB2007/001074
§ 371 (c)(1),
(2), (4) Date: Dec. 24, 2008

(87) PCT Pub. No.: WO2008/068553
PCT Pub. Date: Jun. 12, 2008

(65) Prior Publication Data
US 2010/0002294 A1   Jan. 7, 2010

(51) Int. Cl.
*G02B 27/22* (2006.01)

(52) U.S. Cl.
USPC .............................. 359/462; 348/42

(58) Field of Classification Search
USPC .................................. 359/462, 466
See application file for complete search history.

(56) References Cited

U.S. PATENT DOCUMENTS

| | | | | |
|---|---|---|---|---|
| 2,542,789 A * | 2/1951 | Ames, Jr. | ....................... | 359/451 |
| 4,830,482 A * | 5/1989 | Resnikoff | ................ | 351/159.48 |
| 5,371,627 A | 12/1994 | Baccei et al. | | |
| 5,488,508 A * | 1/1996 | Haseltine | ....................... | 359/362 |
| 5,777,715 A * | 7/1998 | Kruegle et al. | ................ | 351/158 |
| 5,818,399 A * | 10/1998 | Omori et al. | ....................... | 345/8 |
| 6,094,182 A * | 7/2000 | Maguire, Jr. | ....................... | 345/9 |

FOREIGN PATENT DOCUMENTS

FR   2547432   12/1984

OTHER PUBLICATIONS

EPO Office Letter of Jul. 21, 2010 in Corresponding Application 07 734 392 .9—2209.
Machine Translation of FR 2,547,432.

* cited by examiner

*Primary Examiner* — Stephone B. Allen
*Assistant Examiner* — Jyotsna Dabbi
(74) *Attorney, Agent, or Firm* — Anne E. Barschall

(57) ABSTRACT

Two image formation apparatuses are used to create pairs of images of an object analogously to the operation of two human eyes. Then the portions of the images analogous to the nasal field of view of the eyes are removed, leaving the outer portions of each pair of images. These outer portions are combined to create a resultant image that gives an enhanced impression of solidity. The relative proportions of the portions removed from the images are adjustable responsive to factors such as position of the object being imaged.

17 Claims, 4 Drawing Sheets

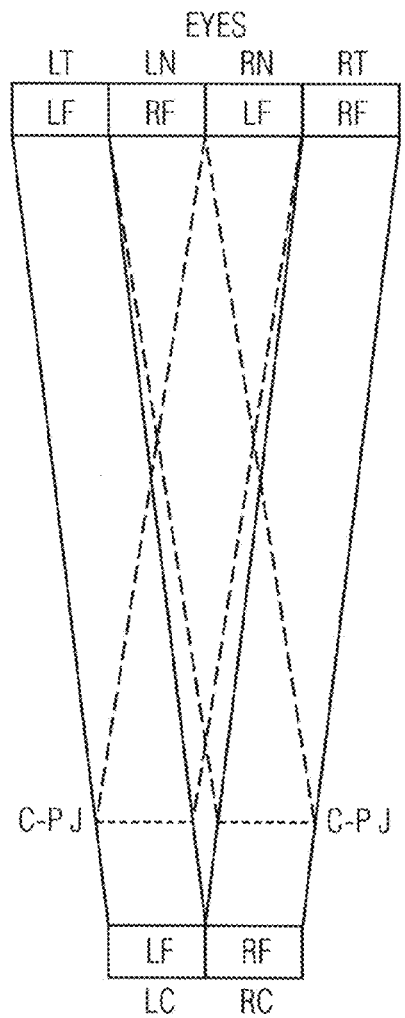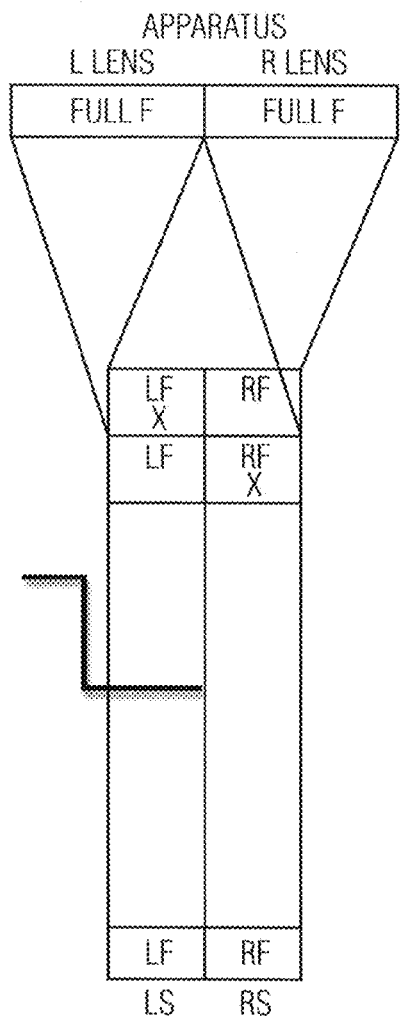
FIG. 2A
FIG. 2B

SOLID VISION

TECHNICAL FIELD

Solid Vision is a vision in which one experiences the breadth, height and depth of the field. Human beings and all the species in nature having two eyes have solid vision. Reproduction of such a vision being the theme of this invention the technical field is photography and vision.

BACKGROUND ART

Human beings have solid vision. It is formed by two eyes set apart in the cavities of facial bone separated by the nose. The belief that both eyes view the same field kept us making cameras with a single set of lens viewing from one point. All along the solid vision is lacking in our prints and movies.

In the last two decades the idea became prevalent that since in nature two eyes view the field from two different points to obtain solid vision, use of two cameras representing the eyes would be necessary to produce the same kind of vision. This idea gave rise to 3D pictures and 3D movies.

In this process the images are formed in pairs, by shooting the field with two still or movie cameras depicting the pair of eyes. The cameras are set parallel to each other at a distance apart. They are fitted with filters of different orientations. In case of stills, the images are printed one over the other and viewed wearing glasses, corresponding to filters used in the cameras. In the case of movies, the sets of images are printed on the same film roll, one in the upper half and the other in the lower half of the width of the film. The movie is projected on the screen magnifying both the recordings to the screen's full height and viewed wearing glasses, corresponding to filters used in the cameras. The resulting picture and the image on the screen give us a sensational feel of depth which, however, is not natural.

The background art of photography in human solid vision depended on the scientific knowledge on the subject of human vision. A concise know-how of human vision is found in a chapter called "The Eye" in the volume named "The Human Body" of the authentic "World Book Encyclopedia of Science". The problems encountered in making a true reproduction in human solid vision can be appreciated from the questions raised on an illustration and on a sentence from the text. In the illustration of "The Visual Pathways" the axes of the eyes are shown converging on an object. If the axes of the eyes are to converge on any object would not all the other objects in the field appear double? In the last sentence of the para three it is said: "The eyes overlapping fields of view produce the binocular vision that enables us to judge depth and distance". If the same field is viewed by the two eyes would not two images which are different from each other appear?

BRIEF DESCRIPTION OF THE DRAWING

The invention will now be described by way of non-limiting example with reference to the following figures:

FIG. 2 is a conceptual diagram illustrating the algorithm of the invention

DETAILED DESCRIPTION

Figure 1:
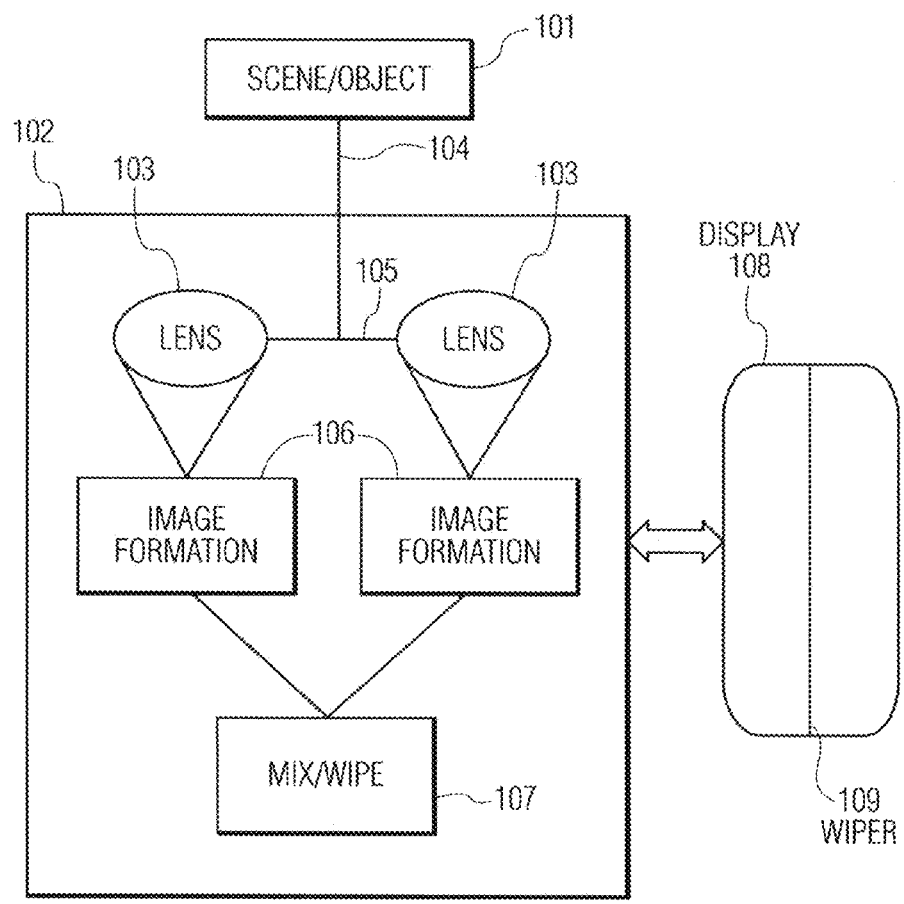
FIG. 1 is a schematic diagram of an embodiment of the invention

Human beings are endowed with solid vision, which enables them to get a feel of depth and a sense of relative distances. The illustration "The Visual Pathways" mentioned in the background art indicates that the eyes' views are represented at the visual cortices where they are combined visually to give the solid vision of the field. Hence solid human vision would mean an exact reproduction of what is registered in the visual cortices when both eyes are opened. Simulating the functions of the pairs of eyes and those of visual cortices at that time, a process has been invented for the production of solid vision.

The observations made and the experiments performed which lead to the invention are described in the same order for the sake of easy narration.

While seeing a 3D movie in a theatre, the glasses supplied were removed and the screen was watched. The whole screen had an almost uniform shadow like double image. The image suggested that the cameras simulating the eyes were positioned very close and parallel to each other. The setting of the pair of eyes and the cameras being same the reason for double image could not be due to a flaw in image formation but due to its simultaneous projection. It would be more appropriate to view the field with video cameras and to mix their images at a mix. The two images appearing in close proximity in quick succession would merge to form a single solid image.

Hence two identical video cameras slim enough to accommodate themselves within 70 mm centre to centre (the maximum distance between an adults' pair of eyes) were procured and fitted with wide angle lens. They were fixed on a horizontal base 70 mm apart and parallel to each other. The field was viewed with the object of interest at the centre. The signals were mixed in a mix and monitored. Two distinct images of the field adjacent to each other were seen; the images did not merge as anticipated. With the hope of merging the two images by using the horizontal shift facility in the mix one of the images was gradually shifted. When the images of the centre object merged all the other object continued to have double images. The cause for continued appearance of the double images was analyzed and the findings are as follows:

Since the cameras are positioned 70 mm apart and parallel to each other the distance between two images of any object on the screen is a reflection of 70 mm distance at the object. Hence nearer the object longer is the distance and farther the object shorter is the distance between its two images. In this experiment when the images of the central object merged the double images of the objects which were nearer to the camera than the centre object came closer to each other but did not merge, the double images of the objects which were farther to the camera than the centre object first merged and then crossed each other. Thus, double images of all the objects did not merge simultaneously.

It was decided to stop the formation of double image by some means. The only way was to refrain the cameras from viewing the other side. Hence about two third of inner side of the lens of both cameras were masked with black rexin. The same field was viewed and the images mixed without changing the horizontal shift. The double images on the sides of the frame disappeared but their presence continued around the centre. Also, the scene on the whole became darker.

It might have been possible to stop the appearance of double images totally by masking the inner side of the lens fully. The scene would have then become too dark for viewing. It is clear, however, that the formation of double image could be stopped fully if the cameras viewed only their respective side of the field, reproducing their side of the field.

This would mean that the left half of the field would be reproduced by the left side camera and the right half of the field would be reproduced by the right side camera in the respective frames leaving the other (inner) halves of their frames blank. The reproduced two halves could then be joined by mixing the two frames in a mix.

Though in theory we could reproduce the full field by following this method, in practice we could not do so as masking half of the lens area would have made the image unacceptably dark. The wiping facility in the mix which is generally utilized to simultaneously end an ongoing scene from one source and to introduce another scene from the other source by slowly wiping the first scene from one end while exposing the other, came to our rescue. This did enable us to obtain the two images with full brightness.

Now, we could reproduce the full field with both the cameras and feed the images into a mix so that the outer halves of the images appear on the respective side, while the wiper cursor is brought to the middle of the frame. The resulting image would be a bright replica of the field.

The details of the recording made to demonstrate the soundness of the aforesaid process are given below. In this recording of about 20 minutes duration the inventor is seen discussing solid vision with his grand sons.

It was found that the available range of horizontal shift in the mix would permit the central object to be at a distance of not less than 10 feet. Accordingly the field was selected and care was taken not to have any cognizable object, excepting the one at 10 feet, along the central line of vision. With the same two identical cameras with wide angle lens, fixed on a horizontal base, 70 mm apart and parallel to each other the field was viewed.

The outputs of the cameras were so connected to the mix that the outer portions of the image formed by them appeared on the respective side of the monitor screen while the wiper liver is operated. When the wiper cursor was brought to coincide with the vertical middle line of the image of the centre object formed by one camera, the image of that object formed by the other camera had crossed the cursor line by a few mms. This image was moved back by shifting horizontally the corresponding source by that distance so that the middle vertical line of that image also coincided with cursor. This operation made a seamless joint of the two images at the middle of the frame.

Towards the end of the recording the wiper lever was moved to one end exposing the full image formed by one of the cameras in order to appreciate the difference between the image created by this process and the usual single point of view. The accidental crossings of the central line of vision shows the need to avoid such interference or any object along that line. When the field was being recorded the eyes were shifted from the screen to view the field in front and it was found that there was no difference whatsoever between the image on the monitor and the field in front; the same solid vision was being recorded.

The recording was done with the centre object at the constant distance. Any change in the distance of the centre object from the camera needs to be followed by an adjustment at the mix with the horizontal shift of a source. If the field has much variations of brightness or hue, they would become more prominent in the two halves. They could, however, be adjusted at the mix.

The first conformation of the correctness of the process came accidentally while passing through a doorway with a sliding door dividing the hall into two halves. The door was about four feet wide and pushed to the other end and I could see the full hall with both eyes. Standing at the one end of the door way I pulled the sliding door up to my nose so that I could see only one side of the hall with each eye. The full hall appeared exactly as before but for a grey narrow vertical patch at the centre formed by the edge of the door. I again pushed the door away and saw the full hall and confirmed that the appearance did not change.

The process can further be tested by very simple observations described below.

1. A vertical plane to the face passing through the nose is made by the two hands with the little finger of one hand touching the thumb of the other hand and the thumb of the former touching the nose. With this position of the hands each eye is effectively restricted to view only its side of the field. The field in front is viewed with both eyes looking straight. The hands are dropped keeping the views unchanged. The field does not appear any different with the hands in front of the nose and with the hands dropped.

2. The inner eyes are prevented from viewing by gently keeping the middle finger of the respective hand over them and the field in front is viewed. The field is then viewed normally. The field does not appear any different without and with the inner eyes' views.

Hence it is seen that when both eyes are open and looking straight the absence of the inner eyes' views do not affect the vision. Similarly, when the two cameras, simulating the eyes, reproduce the field the absence of the inner halves of their images does not affect the reproduction.

The validity of the process brought out by this experiment and further confirmed by observations (i.e.) the invention of solid vision as such needs to be substantiated by scientific reasoning and explanations. This is done by making reference to relevant passages in the authoritative text book on ophthalmology called "Parsons' Diseases of the Eye".

An abbreviated passage on the "Visual Pathways" in the chapter "The Neurology of Vision" is given below.

"The fibres from nuclear region enter the optic nerve on its outer aspect and soon become centrally situated. A partial dicussation occurs wherein the nasal fibres cross the chiasma, while the temporal ones enter the optic tract of the same side to reach the lateral geniculate bodies. The axons of the corresponding neurons are distributed in the optic radiations and end at the tip of occipital pole (visual cartex); each half macula (R. and L.) is thus represented in the corresponding occipital pole" (The temporal side of the macular region is represented in the respective visual cartex and the nasal side of macular region is represented in the opposite visual cartex.)

"The fibres from the peripheral region of the retina, similarly, form two distinct groups corresponding with the temporal and nasal halves of the retina. The distinction is very exact, as if a vertical line divided the retina in to two halves at the level of fovea. The fibres from the temporal half of the retina enter the chiasma and pass to the optic tract of the same side; then they run to the lateral geniculate body. The fibres from the nasal half of each retina enter the chiasma, decussate and pass to the optic tract of the opposite side, the arrangement being such that the direct and crossed fibres pass to the alternating lamina in the lateral geniculate body. The corresponding neurons pass by optic radiations to the corresponding occipital poles (visual cortices)", (The temporal side of the peripheral region is represented in the respective visual cortex and the nasal side of the peripheral region is represented in the opposite visual cortex).

For FIGS. 2A and 2B, the following legend is used:

L—left
R—right
T—temporal
N—nasal
C—cortex
S—screen

X—removed
CPJ—corresponding points join
F—field

Thus, Per FIG. 2A, each temporal side (LT, RT) (macular and peripheral regions) which is an exact half of the retina is represented in the respective visual cortex (LC, RC) and each nasal side (LN RN) in the opposite visual cortex. The figure shows the left field of view (LF) corresponding to the left temporal side and the right nasal side; while the right field of view (RF) corresponds to the left nasal side and the right temporal side.

If an eye is located on the nose line it would have a visual field of slightly more than 180: The temporal eyes (LT, RT) are just exact halves of that eye kept about 35 nun away from the nose line on each side of it with the curved side facing away from each other. Hence the two temporal eyes together would have a visual field of more than 180. Further, the fovea being located slightly on the temporal side of the retina, even the very near objects in the central line of vision would fall within their fields; Hence, the two visual cortices (LC, RC) with the representations of the respective temporal eyes would perceive the total field (LF, RF) even without the complimentary representation of the nasal eyes.

Nasal eyes also are exact halves of an eye kept about 35 mm away from the nose line on each side of it but with the curved side facing each other. Their views are on the other side. Their fields are limited to the front portion of the other side field by the contour of the nose. The nasal eye is represented in the opposite visual cortex.

A nasal eye's representation is very important when the other eye is closed. The open temporal eye views its half of the total field and the nasal eye views the front portion of the other half field. Hence the front field is fully visible even with one eye open. This arrangement is extremely useful and necessary for a person when an eye gets a momentary problem like that of a dust falling into it and more so when it gets into long standing problems like disease or injury. On the other hand, nasal eyes' contribution to the total sight becomes secondary when both eyes are open.

Extracts on "Fixation and Binocular Vision" in the chapter "Anatomy and Physiology of motor mechanism" from the same book are given below.

1. "When a distant object is looked at, the visual axes are practically parallel; the object forms an image on each fovea centrals. Any other object to one side forms its retinal images, upon the temporal side of one retina and upon the nasal side of the other; the retinal areas are coordinated visually in the occipital cortex (visual cortex) so that such an object is seen with both eyes as a single object. These are known as corresponding points, the most important pair of which, is of course fovea". By the same argument it may be said that when a distant object is looked at, the front field forms its image upon the front portion of the temporal side of one retina and upon the nasal side of the other; the retinal areas are coordinated visually in the visual cortices so that the front field is seen with both eyes as single field.

When a single eye looks at a distant object the depth feel available due to the temporal eyes' side vision and its straight look on it s front field is flattened by the nasal eye since it widens the field of view with the front field of the other side without side vision as the same is prevented by the nose. On the other hand when both eyes look at a distant object the nasal eyes' image merges with the temporal eyes' image of the front field and the temporal eyes regain their depth feel with their straight looks and with the vision of both the sides.

Thus, the two temporal eyes looking in parallel at a distance object view two independent fields (exact halves of the total field) adjacent to each other and form the images of the respective field with their depth feel in-tact, on the temporal areas of the respective retina. These retinal areas are joined visually side by side in the visual cortices. This combined image produces the binocular vision (i.e., the natural appearance of the field with which we are accustomed to) enabling us to judge the depth and distance.

Per FIG. 2B, in the present process the two cameras (indicated as L LENS and R LENS), placed in parallel with the same distance between them as between the two eyes, effectively simulating the temporal eyes (with the inner halves (LF X, RF X) of their respective images wiped at the mix) supply images which are exact halves of the total field. The mix simulating the visual cortices join the two images (LS, RS) side by side. The combined image produces the binocular vision enabling us to judge the depth and distance. The plane of the figure defines a first plane that includes the focal points of the lenses. The line segment 201 defines a projection of a second plane, perpendicular to the first plane, and defining the halves. The line segment 201 is not extended to infinity to avoid cluttering the figure.

2. "In view of the distance between the two eyes it is obvious that the retinal images of both the eyes cannot be identical since each eye regards slightly different aspect of any object observed. If the object is a solid body the right eye sees a little more of the right side of the object, and vice versa. The two images are fused psychologically, and the fusion of the slightly divergent images combined with other facts derived from experience enables the person to appreciate the solidity of the object."

It may be noted that in any reproduction the object to be observed is always kept on the central line of vision. In the present process, in view of the distance between the two cameras, each one regards slightly different aspects of any object observed (i.e.) on the central line of vision and, if it is a solid body, shows a little more of its respective side, enabling the person to appreciate the solidity of the object.

3. "If an object is regarded, the images of other objects nearer or farther away cannot fall upon corresponding points . . . . It will be found that nearer object suffer a crossed diplopia, distant object an uncrossed diplopia. This diploppia is physiological and perceptually suppressed in actual vision, but it produces a psychological impression which is translated into appreciation of distance."

This means when an object is regarded the axes of the eyes converge on the object so that the object forms image upon each fovea centralis. It is found that the tilt required in each eye is as small as 4 minutes (1/15 of a degree) only when the object is at 100 feet which increases inversely with distance and is still 40 minutes (2/3 of a degree) only when the object is a at 10 feet. With any tilt, however small it is, the other objects would suffer diplopia.

Hence in the present process even while viewing nearer objects the cameras continue to look parallel to each other with the object regarded at the central line of vision. The images produced are moved horizontally at the mix so that the vertical central line of the images of the object regarded coincide with the central line of the frame. This procedure ensures that the other objects do not suffer diplopia while still keeping the solidity of the object regarded.

It is further observed that when a nearer object is regarded the attention to the peripheral areas reduces and the attention on the object regarded increases, resulting in an apparent shrinking of the surrounding field which in turn improves the appreciation of distances from the object regarded.

In the present process, whenever a nearer object is regarded the two halves of the image are horizontally shifted towards each other till the object regarded is seen in a single image. While doing so, the images of the surrounding field represented by the two halves also move towards each other giving an appearance of shrinking of the surrounding which in turn improve the appreciation of the distances from the object regarded.

The advantageous effect of the present process over the process of the background art is due to its factual representation of the human sight when both eyes are open and looking straight. In this situation the image of the field is built up by visually joining the representation of the two temporal retinal areas at the visual cortices. In the same way, in the present process the image of the field is built up by joining the outer halves (temporal side) of the images formed by the two cameras, at the mix. Hence the image becomes an exact replica of the eyes view at the site.

In the background process the field is viewed by both the cameras and the images formed are projected on the screen. In order that each of the overlapping image is separately seen by the respective eye, filters with different orientations are used while shooting and the same worn while viewing. Since this is not a factual representation of human sight the resulting images though sensational are unnatural.

In short, the background process attempts to combine the retinal images, an intermediate stage in visual perception; whereas the present process combines their representation at the visual cortices, the final stage in visual perception.

The solid vision process in principle is looking at objects so well as the nature has empowered the living beings with their pair of eyes. It is a way of viewing outside world as taught by the nature. It need not be confined to match the human beings' experience of vision and to reproduce it for him. It could be used wherever an object is to be viewed, if it can improve his experiencing it or working with it. It can be utilized to form image of objects of any size in any space so as to suit the purpose.

Per FIG. 1, the viewing is done along the line segment 104 perpendicular to the plane of the object 101 and passing through its centre. As with FIG. 2B, the plane of the figure defines the first plane that includes the focal point of the lenses and an aspect of the object 101. The second plane, perpendicular to the paper, is defined by its projection on the line segment 104. Again, extensions of the line segment 104 to infinity are omitted to avoid cluttering the figure. Two identical viewing instruments are placed on a horizontal plane parallel to each other equally away from a point fixed on the above said line (or) A single viewing instrument 102 with two identical sets of lenses 103 kept on a horizontal plane parallel to each other equally away from the central line of the instrument is placed along the said line. The distance 105 between the two instruments or between the two sets of lenses in the single instrument depends on the size of the object and the purpose for which it is viewed. With this variation in the viewing apparatus solid vision image of any object in the universe can be formed.

The two images formed by the two instruments 106 (or) the two sets of lens of the single instrument are fed to a mix 107 as two sources and the frame wiped as shown at 109 to the middle exposing the outer halves of the images 108 on the respective side. One of the sources is horizontally shifted so that the vertical central lines of the two images of the centre object coincide at the centre of the frame and produce a solid vision Image.

Any image produced following this solid vision process will render a better appreciation of the solidity of the object and also of the depth and distances in the space around.

Figure 3:
FIG. 3 is a conventional still photograph of a man sitting
Figure 4:
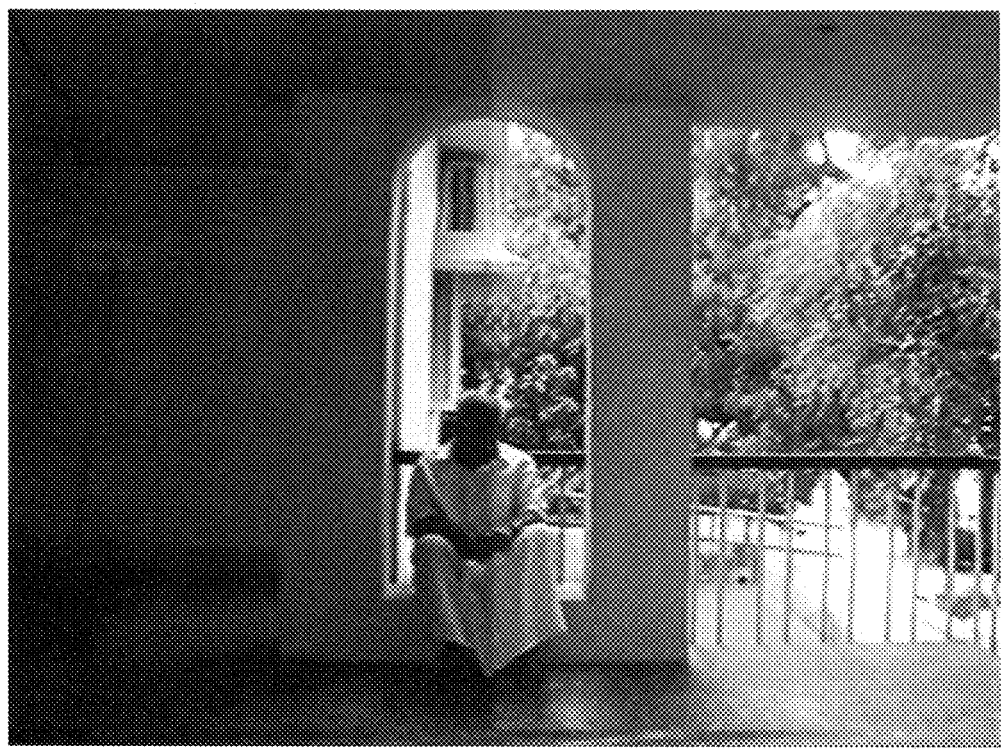
FIG. 4 is a bisected still photograph of the man sitting showing enhanced solid vision

FIGS. 3 and 4 are stills from a video, which showed imaging with and without an embodiment of the invention. FIG. 3 shows a conventional image. FIG. 4 shows an image in accordance with the embodiment, including a left temporal portion LT and a right temporal portion RT to yield a combined image with solid vision effect.

BEST MODE FOR CARRYING OUT INVENTION

Incorporating the present process any kind of camera can be developed. It may, however, be far easier to develop a video camera than film based still or movie camera. Again it will be more economical to introduce features needed for the present process in a provon model than designing a new one.

The additional parts required are,
1. One set of lens assembly with image screen
2. A miniature mix with wiping facility and provision for horizontal shift of one or both sources.

The two sets of lens will be parallel to each other at eye distance (say 70 mm) and will have a common focusing mechanism. The mix may be positioned behind the image screens. It will receive signals from both the screens and its output as seen at the viewer will be an image consisting of the outer halves of the images formed by the two sets of lens.

The combined image in the viewer screen will have an overlap at the middle of the frame. The amount of overlap is inversely proportional to the dance between the central object and the camera (i.e.) farther the object lesser the overlap. A provision similar to that of manual focusing will be made available on the body of the camera for horizontal shifting of the image/images. Using this provision one of the sources is (or both the sources are) horizontally, shifted so that the vertical central lines of the two images of the centre object coincide at the centre of the frame producing a solid vision image of the object.

The amount of movement required between the lens for focusing is also a function of the distance between the object and the camera. Hence the available sensor portion of the auto focus facility may be utilized to incorporate an auto horizontal shift facility. A camera built on these lines might even become a prototype solid vision camera later.

ALTERNATE MODE OF CARRYING OUT INVENTION

The mode described is the same as the one followed by the inventor. Equipments required:
1. Two identical video cameras (handicams—slim enough to be kept parallely with in 70 mm centre to centre with wide lens attached)
2. A mix with facility to shift one or both the sources.
3. A video taperecorder.
4. A monitor large enough to detect and correct minute defects in alignment.

Details of the equipments used:
1. Two Panasonic Slim VHS Movie camera (The nomenclature "slim" suggested itself and hence a pair of them were produced).
2. Rolan Video Mix: Title Processor V5.
3. Panasonic Video Cassette Recorder.
4. L.G. Color T.V. 12".

Connections to made:
1. Camera Audio/Video outputs To Mix Source I Source II inputs
2. Mix outputs To Recorder inputs
3. Recorder outputs to Monitor inputs.

Even with the slim design of the camera chosen one side of a camera needed a little trimming to keep the centre to centre distance within 70 mm. (the on/off lever was cut by half, the hood of the power input lead removed; the sleeve of audio and video inputs cut by half). The most difficult part of the arrangement is the firm positioning of the cameras on a base: parallely, 70 mm apart in the same horizontal and vertical plane. Even minute defects in their alignment get greatly exaggerated in the images formed. The cameras could not at all be fixed on a single base because of minute undulations in their bottom plates. Hence the cameras were fixed on two independent base plates one in the front and the other in the rear.

The machined portion about the screw thread (used for fixing the camera on stand) was used to bolt the cameras to a base plate at the front. The bottom plate of the battery holder at the rear was found to be sufficiently flat. A small hole drilled at the centre of this bottom plate of each of the camera was used to fix them to another base plate at the rear.

A perfect alignment needs to be ensured while fixing the cameras firmly on the bases. Alignment is done by:

The faces of the lens assembly are positioned on the same vertical plane by pressing them against a plain glass plate. The distance between the camera centers both in the rear and the front was kept at 70 mm. The above arrangement kept the cameras parallel to each other 70 mm apart in the same horizontal and vertical plane.

The alignment is checked and confirmed by the following observation:

A bright object of 70 mm length is kept at a distance on the central line between the cameras and parallel to the plane of lens surface. When the cameras are truly parallel (i.e.) on the same horizontal and vertical planes and at 70 mm apart the images of the object shall fall on a horizontal line just touching each other at one edge.

Once the assembly is firm and perfect a scene may be shot and recorded. It is important to see that no cognizable object is on the centre line excepting the one of interest and the scene is reasonably equally bright on both sides. The combined image seen on the monitor will have an overlap at the middle of the frame. The amount of overlap is inversely proportional to the distance between the centre object and the camera (i.e.) farther the object lesser the overlap. Using the provision in the mix one of the sources is horizontally shifted so that the vertical central lines of the two images of the centre object coincide at the centre of the frame producing a solid image of the object.

INDUSTRIAL APPLICABILITY

The industry would find the process quite easily adoptable. The process requires changes in the image forming area only. If the two cameras with a simple mix mode is followed it does not call for any change in the design or construction. If the single camera with two sets of lens and in-built mix mode is followed also only minimal changes are required in the design and construction.

The feel-at-site experience provided by the solid vision pictures and movies will excite the general public so much that there will be a spontaneous demand for more of them. The media with its intrinsic eagerness to satisfy the public will come up with an overwhelming demand for these solid vision cameras.

The process, being a natural process in vision, will find expression in all the fields where a camera or any image forming apparatus in any form is used; to name a few, 1. Scientific (Atomic, Nuclear)
2. Medical (Microscope, Endoscope)
3. Engineering (using x-rays, infra-red rays, laser)
4. Survey (ground, Oceanic) and
5. Space (Satellite, outerspace)

The invention claimed is:

1. A method comprising:
obtaining first and second images of a scene to be imaged, from image formation apparatus;
segmenting each image into respective first and second portions prior to display;
receiving and mixing a first and second signals, representative of the first and second images respectively, in a mixer and
wiping the second portion of the first image and the first portion of the second image;
displaying the first portion of the first image adjacent to the second portion of the second image to yield a result image perceivable as solid by a viewer,
wherein
for the first image, the first portion substantially corresponds to an expected temporal portion of a field of view of a user's first eye and the second portion substantially corresponds to an expected nasal portion of the field of view of the user's first eye;
for the second image, the first portion substantially corresponds to an expected nasal portion of a field of view of the user's second eye and the second portion substantially corresponds to an expected temporal portion of the field of view of the user's second eye; and
the result image substantially eliminates the expected nasal portions of the first and second images.

2. The method of claim 1, comprising adjusting a relative size of the first and second portions in accordance with a distance from an object in the scene to the image formation apparatus prior to display.

3. The method of claim 1, wherein the result image is perceivable as solid by the viewer looking straight ahead.

4. The method of claim 1, wherein the image formation apparatus comprises at least one camera.

5. The method of claim 1, wherein the physical image formation apparatus comprises first and second identical lenses for forming the first and second images, respectively.

6. The method of claim 5, wherein the lenses are separated by a distance comparable to that between two human eyes in a human face, the focal points of the lenses forming a first plane in conjunction with some aspect of the scene and a second, perpendicular plane bisecting the distance and the scene, such that—in the result image—the first portion of the first image and second portion of the second image join at first and second sides of the second plane.

7. The method of claim 6, wherein the first plane is horizontal and the second plane is vertical.

8. The method of claim 5, wherein the lenses are separated by a distance adapted to a desired application.

9. The method of claim 1, wherein the physical image formation apparatus comprises first and second identical assemblies for forming the first and second images, respectively.

10. The method of claim 9, wherein the assemblies are separated by a distance comparable to that separating a pair of human eyes.

11. Apparatus comprising:
first and second image formation devices;
at least one processor for performing operations comprising
segmenting each image into respective first and second portions prior to display; and combining the first portion of the first image with the second portion of the second image to yield a result image perceivable as solid by a viewer;

mixer adapted to receive a first and second signals representative of the first and second images, respectively and mix the first and second signals by wiping the second portion of the first image and the first portion of the second image;

at least one display adapted to display the result image wherein for the first image, the first portion substantially corresponds to an expected temporal portion of a field of view of a user's first eye and the second portion substantially corresponds to an expected nasal portion of the field of view of the user's first eye;

for the second image, the first portion substantially corresponds to an expected nasal portion of a field of view of the user's second eye and the second portion substantially corresponds to an expected temporal portion of the field of view of the user's second eye; and the result image is a single real image consisting of the first portion of the first image and the second portion of the second image adjacent to one another; and the result image substantially eliminates the expected nasal portions of the first and second images.

12. The apparatus of claim 11, wherein the operations comprise adjusting a relative size of the first and second portions in accordance with a distance from an object in the scene to the image formation devices.

13. The apparatus of claim 12, wherein the result image gives a solid impression when regarded by a viewer looking straight ahead.

14. The process of claim 1, wherein the first and second images are real images; and the first and second portions of the first and second images are formed by dividing the first and second images in half, respectively, based on geometries of the images.

15. The apparatus of claim 11, wherein the first and second images are real images; and the first and second portions of the first and second images are formed by dividing the first and second images in half, respectively, based on geometries of the images.

16. The process of claim 1, wherein the first portion of the first image and the second portion of the second image do not depict overlapping regions of the scene; and the first portion of the first image and the second portion of the second image are displayed adjacent to one another to create a single result image.

17. The apparatus of claim 11, wherein the first portion of the first image and the second portion of the second image do not depict overlapping regions of the scene; and the first portion of the first image and the second portion of the second image are displayed adjacent to one another to create a single result image.

* * * * *